United States Patent

Lay

[15] 3,666,981

[45] May 30, 1972

[54] GAS CELL TYPE MEMORY PANEL WITH GRID NETWORK FOR ELECTROSTATIC ISOLATION

[72] Inventor: Frank M. Lay, Kingston, N.Y.

[73] Assignee: International Business Machines Corporation, Armonk, N.Y.

[22] Filed: Dec. 18, 1969

[21] Appl. No.: 886,100

[52] U.S. Cl. ........................313/190, 313/210, 315/169 TV, 315/337

[51] Int. Cl. ........................H01j 17/04

[58] Field of Search ..................313/210, 190, 109.5, 108 B; 315/337, 169 R, 169 TV

[56] References Cited

UNITED STATES PATENTS

| | | | |
|---|---|---|---|
| 1,945,639 | 2/1934 | Holden | 313/190 |
| 2,686,273 | 8/1954 | Hough et al. | 313/190 |
| 2,859,385 | 11/1958 | Bentley | 315/169 TV |
| 2,906,906 | 9/1959 | McCauley et al. | 313/210 X |
| 2,925,525 | 2/1960 | Davis | 313/108 B X |
| 3,096,516 | 7/1963 | Pendleton et al. | 315/169 TV |

*Primary Examiner*—Roy Lake
*Assistant Examiner*—Palmer C. Demeo
*Attorney*—Edwin M. Thomas, Ralph L. Thomas and Thomas and Thomas

[57] ABSTRACT

A display panel has horizontal coordinate drive lines and vertical coordinate drive lines disposed on opposite sides of a gas-filled envelope. Additional horizontal lines disposed between the horizontal coordinate drive lines and additional vertical lines disposed between the vertical coordinate drive lines may be left unconnected or floating, or they may be connected to a common potential. The additional horizontal lines and the additional vertical lines constitute a grid network which electrostatically shields each gas cell from all remaining gas cells defined by the coordinate intersections of the vertical and horizontal coordinate drive lines.

6 Claims, 2 Drawing Figures

Patented May 30, 1972

3,666,981

INVENTOR

FRANK M. LAY

BY Thomas & Thomas

ATTORNEYS

GAS CELL TYPE MEMORY PANEL WITH GRID NETWORK FOR ELECTROSTATIC ISOLATION

CROSS REFERENCE TO RELATED APPLICATIONS

1. Application Ser. No. 785,210 for Gas Panel Apparatus and Method by George M. Krembs filed Dec. 19, 1968, now U.S. Pat. No. 3,611,019.
2. Application Ser. No. 885,086 for Improved Method and Apparatus for a Gas Display Panel by Tony N. Criscimagna et al. filed Dec. 15, 1969.

BACKGROUND OF THE INVENTION

This invention relates to display devices and more particularly to such devices which employ gas cells.

The drive signals for the horizontal coordinate drive lines and the vertical coordinate drive lines of gas display panels must be uniform within a relatively high degree of precision if reliable writing and erasing operations are to take place selectively. As the density of cells, the number of gas cells per unit area on the gas panel increases, the need for still greater precision is required of the drive signals applied to the horizontal and vertical coordinate drive lines. The presence of half-select signals on non-selected gas cells increases the problem as the density of gas cells on the gas panel increases. The half-select signals are signals applied to all gas cells on the selected horizontal line and the selected vertical line. The potential difference applied across the selected gas cell for a write operation exceeds the ignition potential of this cell and the violent activity of charged particles in the selected gas cell tends to "-spill over" to adjacent gas cells. This raises the undesirable prospect of possibly igniting adjacent gas cells, particularly those receiving a half-select potential difference. The potential difference applied across a selected gas cell during a write operation exceeds the ignition potential of the selected gas cell, and the violent activity of charged particles taking place in the selected gas cell can and does change the turn-on and turn-off characteristics of affected gas cells nearby. Furthermore, the number of sustaining gas cells adjacent to dark gas cells is an ever changing combination of variables resulting in different cell histories. This makes the turn-on characteristic of any gas cell an unpredictable variable, and it tends to make selective write and erase operations less reliable. One solution is to mechanically isolate each gas cell so that plasma discharge activity in one cell does not "spill over" to adjacent cells but this poses technical and economic problems if resort is made to the mechanical isolation of each gas cell by the so called "honeycomb" construction whereby each gas cell is composed of a separate gas pocket. Moreover, this type of construction tends to limit the number of gas cells per square inch which can be provided on the face of the panel, and the resolution of the displayed characters consequently is diminished. It is to this problem that the present invention is directed.

SUMMARY OF THE INVENTION

It is a feature of this invention to provide a gas panel construction with a high density of gas cells wherein reliable reading and writing operations may take place selectively.

It is a feature of this invention to provide an improved gas panel construction wherein each gas cell is electrically isolated from all the remaining gas cells.

It is a feature of this invention to provide an improved gas panel construction wherein each gas cell is electrostatically isolated from all remaining gas cells.

In one arrangement according to this invention a gas display panel comprises a container filled with a gas which may be illuminated by an ignition or firing potential applied thereacross. A plurality of horizontal coordinate drive lines are disposed on one side of the gas panel, and a plurality of vertical coordinate drive lines are disposed on the opposite side of the gas panel with the vertical coordinate drive lines extending orthogonally to the horizontal coordinate drive lines. The crossover regions of the horizontal and vertical coordinate drive lines define coordinate intersections, and the gas between the coordinate lines at such coordinate intersections constitute gas cells which may be ignited by electrical firing potentials supplied to the vertical and horizontal coordinate drive lines. The various gas cells are selectively ignited or selectively not ignited to represent binary information. A plurality of additional horizontal lines are disposed between the horizontal coordinate drive lines, and a plurality of additional vertical lines are disposed between the vertical coordinate drive lines. The additional horizontal lines and the additional vertical lines form a grid network which electrically isolates each gas cell from each remaining gas cell of the gas display panel. The additional horizontal lines and the additional vertical lines which form the isolation grid network may be left unconnected, or they may be connected to a common potential. In either case they provide electrostatic isolation of the gas cell defined by the coordinate intersection of the vertical coordinate drive line and the horizontal coordinate drive lines.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
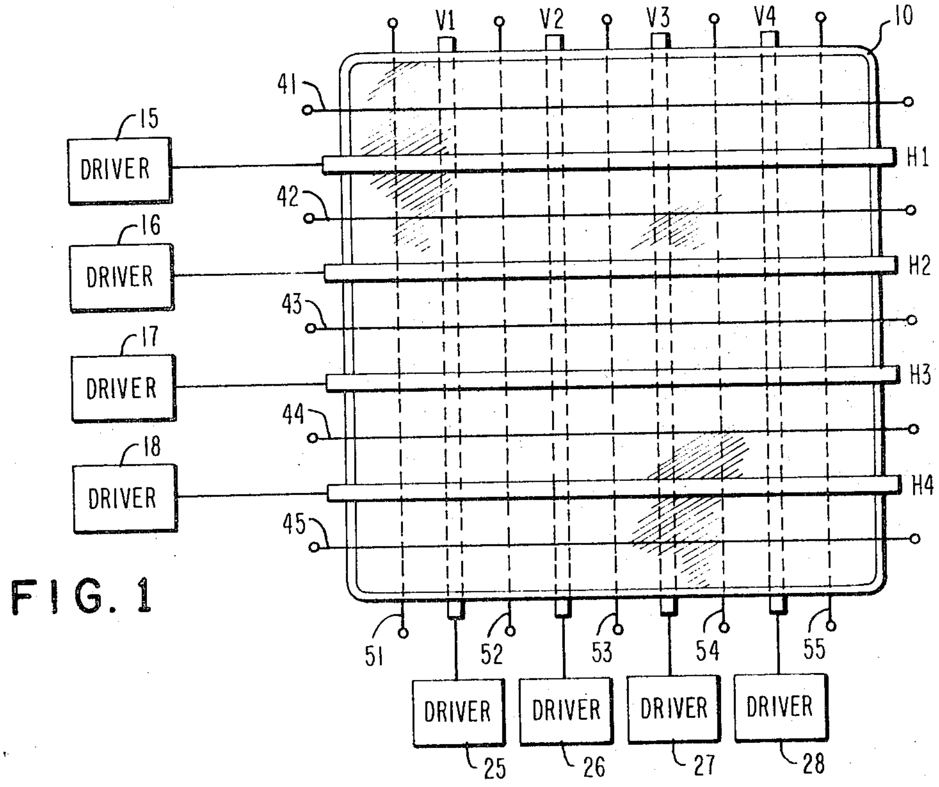
FIG. 1 illustrates one arrangement of a display panel constructed according to this invention with the isolation grid network left unconnected.

Referring first to FIG. 1, a gas-filled envelope 10 is disposed between a set of vertical conductors V1 through V4 and a set of horizontal conductors H1 through H4. Drivers 15 through 18 supply operating signals to the respective horizontal lines H1 through H4, and drivers 25 through 28 supply operating signals to the respective vertical lines V1 through V4. The gas filled envelope 10 may be constructed in the manner illustrated and described in co-pending application Ser. No. 785,210 filed Dec. 19, 1968 for Gas Panel Apparatus and Method by George M. Krembs. Circuits for supplying operating signals to the vertical lines V1 through V4 and the horizontal lines H1 through H4 may be of the type illustrated and described in co-pending application Ser. No. 885,086 filed Dec. 15, 1969 for Improved Method and Apparatus for a Gas Display Panel by Tony N. Criscimagna et al. It is pointed out, however, that other types of gas panel construction and other types of circuits for supplying operating signals may be employed.

The operating circuits supply signals to the gas panel 10 in FIG. 1 to ignite selected cells thereby to generate visual patterns representing numbers, letters, and symbols. This is done by supplying a potential difference across the selected cells which exceeds the ignition potential. Once ignited, the cells are periodically reignited by a potential difference applied thereacross which exceeds the sustain level. Sustain signals are applied as long as it is desired to maintain the lighted letters, characters, and symbols. When it is desired to erase given letters, numbers, or symbols, and erase operation takes place which extinguishes the ignited gas cells of the selected letter, number, or symbol. An erase operation is performed by reducing the charge in a selected cell thereby to extinguish the cell.

The drive signals for the horizontal coordinate drive lines and the vertical coordinate drive lines of gas panel devices must be uniform within a relatively high degree of precision if reliable writing and erasing operations are to take place selectively. As the number of gas cells per unit area on the panel increases, the need for still greater precision is required of the drive signals applied to the horizontal and vertical coordinate drive lines. The presence of half-select signals on non-selected cells increases the problem as the density of gas cells on the gas panel increases. The half-select signals are signals applied to all gas cells on the selected horizontal line and the selected vertical line. The potential difference applied across the selected gas cell for a write operation exceeds the ignition potential of this cell, and the violent activity of charged particles in the selected gas cell tends to "spill" over to adjacent cells. This raises the undesirable prospect of possibly igniting adjacent gas cells, particularly those receiving a half-select potential difference. The potential difference applied across a selected gas cell during a write operation exceeds the ignition potential of the selected gas cell, and the violent molecular activity taking place in the selected gas cell can and does change the turn-on and turn-off characteristics of affected gas cells nearby. Furthermore, the number of sustaining gas cells adjacent to dark gas cells is an ever changing combination of variables resulting in different cell histories. This makes the turn-on characteristic of any gas cell an unpredictable variable, and it tends to make selective write and erase operations less reliable. One solution, as pointed out earlier, is to mechanically isolate cells so that plasma discharge activity in one cell does not "spill" over to adjacent cells, but this poses technical and economic problems if resort is made to the mechanical isolation of each cell by the so called "-honeycomb" construction whereby each cell is composed of a separate gas pocket. Moreover, this type of construction tends to limit the number of cells per square inch which can be provided on the face of the panel, and the resolution of the displayed characters consequently is diminished.

It is the feature of this invention to provide for a high density of gas cells, say at least on the order of 2,500 cells per square inch, and yet provide for the reliable write, sustain, and erase operations. This is accomplished according to this invention by providing electrical isolation of each cell from adjacent cells.

Electrical isolation of the gas cells is accomplished by providing additional horizontal lines 41 through 45 in FIG. 1 and additional vertical lines 51 through 55. The horizontal lines 41 through 45 are disposed as shown between the associated horizontal coordinate drive lines H1 through H4. The vertical drive lines 51 through 55 are disposed as shown between the coordinate vertical drive lines V1 through V4. The horizontal coordinate drive lines H1 through H4 and the additional horizontal lines 41 through 45 are disposed above the gas panel 10, and the vertical coordinate drive lines V1 through V4 and the additional vertical lines 51 through 55 are disposed beneath the gas panel 10 in FIG. 1. The additional horizontal lines 41 through 45 and the additional vertical lines 51 through 55 constitute a grid network which encompasses or surrounds each gas cell of the gas panel 10, and each gas cell is electrostatically isolated from adjacent gas cells. The additional horizontal lines 41 through 45 and the additional vertical lines 51 through 55 may be left unconnected as shown in FIG. 1.

Figure 2:
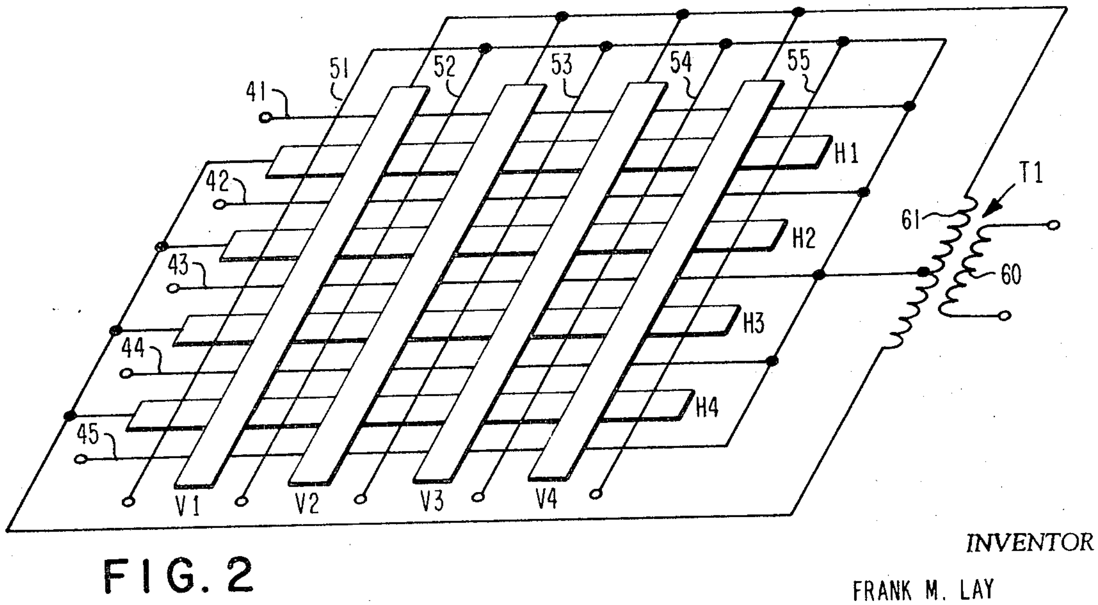
FIG. 2 illustrates another embodiment of a gas display panel constructed according to this invention with the isolation grid network being connected to a common potential, the gas-filled envelope and drivers circuits in FIG. 1 being omitted in the interest of simplicity.

The additional horizontal lines 41 through 45 and the additional vertical lines 51 through 55 may be connected to a common potential as illustrated in FIG. 2. FIG. 2 shows the gas panel construction with the gas filled container 10 removed. FIG. 2 portrays more graphically the grid network formed by the horizontal coordinate drive lines H1 through H4 and the vertical coordinate drive lines V1 through V4 and the grid network formed by the additional horizontal lines 41 through 45 and the additional vertical lines 51 through 55. A transformer T1 in FIG. 2 has a primary winding 60 and a centertapped secondary winding 61. Gates, amplifiers, and control circuitry are omitted in FIG. 2 in the interest of simplicity. High voltage signals from the upper end of the secondary winding 61 are used to energize the vertical coordinate drive lines V1 through V4, and high voltage signals from the lower end of the secondary winding 61 are used to energize the horizontal coordinate drive lines H1 through H4. The additional horizontal lines 41 through 45 and the additional vertical lines 51 through 55 are connected to the centertap of the secondary winding 61. The additional horizontal lines 41 through 45 and the additional vertical lines 55 through 55 provide similar electrostatic shielding effects when left unconnected as shown in FIG. 1 as when connected to a common point as shown in FIG. 2. In each case electrostatic shielding of each gas cell from adjacent gas cells is provided. This electrical isolation of the gas cells permits reliable write, erase, and sustain operations to take place selectively throughout the gas panel, and a gas panel with a high density of gas cells may be reliably operated without "spill" over taking place.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A gas panel including:

a gas container filled with an illuminable gas, a plurality of electrically conductive horizontal coordinate drive lines disposed in parallel and lying in a first plane on one side of the gas container, a plurality of electrically conductive additional horizontal lines disposed in the first plane and extending parallel to the horizontal coordinate drive lines with each individual one of the horizontal coordinate drive lines disposed between a different pair of said additional horizontal lines, a plurality of electrically conductive vertical coordinate drive lines disposed in parallel and lying in a second plane on the opposite side of the gas container, said vertical coordinate drive lines extending orthogonally to the horizontal coordinate drive lines, a plurality of electrically conductive additional vertical lines disposed in the second plane and extending parallel to the vertical coordinate drive lines with each individual one of the vertical coordinate drive lines disposed between a different pair of said additional vertical lines, and first driver means connected to the horizontal coordinate drive lines, second driver means connected to the vertical coordinate drive lines, said first and second driver means serving to ignite gas cells at selected coordinate intersections, and said additional horizontal lines and said additional vertical lines constituting a network which provides isolation of gas cells defined by the coordinate intersections of the horizontal coordinate drive lines and the vertical coordinate drive lines.

2. A gas panel including:

a flat gas container filled with an illuminable gas, a plurality of electrically conductive horizontal coordinate drive lines disposed on one side of the flat gas container, said plurality of horizontal coordinate drive lines running parallel with each other and lying in a common plane, a plurality of electrically conductive additional horizontal lines disposed parallel to and interspersed with said horizontal coordinate drive lines, said additional horizontal lines lying between said horizontal coordinate drive lines and lying in the same plane as the plurality of horizontal coordinate drive lines, a plurality of electrically conductive vertical coordinate drive lines disposed on the opposite side of said flat gas container, said plurality of vertical coordinate drive lines running parallel with each other and lying in a common plane, said plurality of vertical coordinate drive lines lying orthogonally with respect to the plurality of horizontal coordinate drive lines, a plurality of electrically conductive additional vertical lines disposed parallel to and interspersed with the vertical coordinate drive lines, said plurality of additional vertical lines lying between said vertical coordinate drive lines and lying in the same plane as said plurality of vertical coordinate drive lines, driver means connected to said plurality of horizontal coordinate drive lines and said plurality of vertical coordinate drive lines for applying a first potential to a selected one of said horizontal coordinate drive lines and a second potential to a selected one of said vertical coordinate drive lines, and means connecting the additional horizontal lines and the additional vertical lines to a common potential, whereby the first potential of the driver means applied to a selected one of said horizontal coordinate drive lines and the second potential of the driver means supplied to a selected one of the vertical coordinate drive lines serve to ignite gas cells at selected coordinate intersections, and said additional horizontal lines and said additional vertical lines constitute a grid network which provides electrostatic isolation of gas cells defined by the coordinate intersections of the horizontal coordinate drivelines and the vertical coordinate drive lines.

3. The apparatus of claim 2 wherein said driver means includes first driver means connected to the horizontal coordinate drive lines and second driver means connected to the vertical coordinate drive lines.

4. A gas panel including:

a gas container filled with an illuminable gas, a plurality of parallel horizontal coordinate drive lines which are electrically conductive disposed in a first plane on one side of the gas container, a plurality of additional horizontal lines which are electrically conductive disposed in said first plane parallel to and interspersed with the horizontal coordinate drive lines whereby alternate lines in said first plane are horizontal coordinate drive lines, a plurality of parallel vertical coordinate drive lines which are electrically conductive disposed in a second plane on the opposite side of the gas container, said plurality of vertical coordinate drive lines lying orthogonally with respect to the plurality of horizontal coordinate drive lines, a plurality of additional vertical lines which are electrically conductive disposed in said second plane extending parallel to and interspersed with the vertical coordinate drive lines whereby alternate lines in said second plane are vertical coordinate drive lines, and means connecting the additional horizontal lines and additional vertical lines to a common potential, whereby the additional horizontal lines and additional vertical lines constitute a grid network which provides isolation of gas cells defined by the coordinate intersections of the horizontal drive lines and the vertical drive lines.

5. A gas panel including:

a gas container filled with an illuminable gas, a plurality of parallel horizontal coordinate drive lines which are electrically conductive disposed in a first plane on one side of the gas container, a plurality of additional horizontal lines which are electrically conductive disposed in said first plane parallel to and interspersed with the horizontal coordinate drive lines whereby alternate lines in said first plane are horizontal coordinate drive lines, a plurality of parallel vertical coordinate drive lines which are electrically conductive disposed in a second plane on the opposite side of the gas container, said plurality of vertical coordinate drive lines lying orthogonally with respect to the plurality of horizontal coordinate drive lines, and a plurality of additional vertical lines which are electrically conductive disposed in said second plane extending parallel to and interspersed with the vertical coordinate drive lines whereby alternate lines in said second plane are vertical coordinate drive lines, whereby the additional horizontal lines and additional vertical lines constitute a grid network which provides isolation of gas cells defined by the coordinate intersections of the horizontal drive lines and the vertical drive lines.

6. The apparatus of claim 5 including means which connects the additional horizontal lines and additional vertical lines to each other.

* * * * *